United States Patent [19]  
Imamura et al.

[11] 4,070,191  
[45] Jan. 24, 1978

[54] SILVER HALIDE EMULSION CONTAINING COLORED MAGENTA COUPLER FOR PHOTOGRAPHY

[75] Inventors: Hiroyuki Imamura; Shui Sato; Tamotsu Kojima; Takaya Endo, all of Hino, Japan

[73] Assignee: Konishiroku Photo Industry Co., Ltd., Tokyo, Japan

[21] Appl. No.: 455,121

[22] Filed: Mar. 27, 1974

[30] Foreign Application Priority Data

Mar. 31, 1973 Japan ................................. 48-36178

[51] Int. Cl.$^2$ ............................................. G03C 1/40
[52] U.S. Cl. ........................................ 96/100 R; 96/9; 96/56.5
[58] Field of Search ..................... 96/100, 9, 56.5

[56] References Cited

U.S. PATENT DOCUMENTS

| | | | |
|---|---|---|---|
| 3,476,564 | 11/1969 | Mariani et al. | 96/100 |
| 3,576,635 | 4/1971 | Sakamoto et al. | 96/100 |
| 3,671,257 | 6/1972 | Otto et al. | 96/100 |
| 3,790,379 | 2/1974 | Oishi et al. | 96/100 |

Primary Examiner—Travis Brown  
Attorney, Agent, or Firm—Bierman & Bierman

[57] ABSTRACT

A coloured magenta coupler for photography is disclosed which is represented by the following general formula:

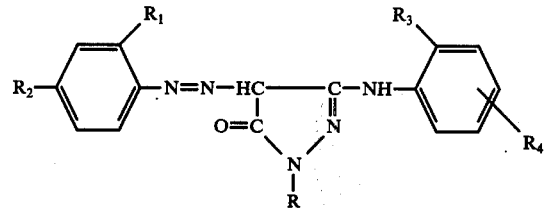

wherein R is substituted phenyl, $R_1$ and $R_2$ individually stand for hydrogen, halogen, hydroxyl, alkyl, alkoxy or acylamino, with the proviso that one of $R_1$ and $R_2$ is hydroxyl but that both are not hydroxyl simultaneously, $R_3$ is hydrogen, halogen, alkyl, nitro or acylamino and $R_4$ stands for hydrogen, halogen or a monovalent organic residue.

3 Claims, No Drawings

SILVER HALIDE EMULSION CONTAINING COLORED MAGENTA COUPLER FOR PHOTOGRAPHY

This invention relates to a photographic colored magenta coupler for use in the auto-masking for correction of defects of color reproduction in silver halide photosensitive materials for color photography.

In the subtractive color photography, blue sensitive, green sensitive and red sensitive layers are so constructed that yellow, magenta and cyan color images are formed, respectively. However, each of the dyes formed as color images has not always ideal absorption characteristics. For instance, the magenta dye image not only has a necessary green color absorption but also generally absorbs a blue color more or less, with the result that distortion is brought about in respect of color reproduction. In order to remove such distortion of color reproduction there are generally employed so called colored magenta couplers which exhibits a yellow color when they do not cause the coupling reaction as magentan couplers.

As such colored magenta couplers there have been known 4-arylazo-5-pyrazolones having at the 1- or 3-position a substituent containing a long-chain hydrocarbon group imparting a diffusion resistance to the couplers, such as disclosed in the specifications of U.S. Pat. Nos. 2,449,966 and 2,455,170, 1-phenyl-4-arylazo-5-pyrazolones having at the 3-position a 2-haeogeno-5-alkylamino-anilino or 2-halogeno-5-acylamino-anilino group, such as disclosed in Japanese Patent Publication No. 15754/69, and the like.

However, 5-pyrazolones having an arylazo substituent at the 4-position have generally a lower rate of coupling with an oxidation product of a p-phenylene diamine derivative than 5-pyrazolones having no substituent at the 4-position, and therefore, in the case of 4-arylazo-5-pyrazolones it is difficult to obtain a sufficient photographic sensitivity and a sufficient dye density. In these days, the development technique in color photography is greatly advanced and the color development is usually conducted according to the high-temperature prompt-treatment method. Silver halide photographic photosensitive materials that can be effectively applied to such high-temperature prompt-treatment method are first of all required to include a coupler having a high coupling rate and with use of such photosensitive materials it is for the first time made possible to obtain desired photographic sensitivity and dye density. Further, the high coupling rate results in decrease of the amount of the coupler used, reduction of the thickness of the photosensitive material coating and improvement of the image sharpness.

A colored magenta coupler is generally used in combination with a substantially colorless magenta coupler capable of forming a colored dye image of a hue similar to that of the colored magenta coupler. From the viewpoint of color compensation it is preferred that the absorption maximum wavelength of the masked dye image in the blue ray region is in agreement with the absorption maximum wavelength of the secondary absorption band in the blue ray region of the magenta dye image formed by the colorless magenta coupler used in combination. Most of now available, useful colorless magenta couplers have an absorption maximum of the secondary absorption band at a wavelength ranging from 430 to 460 m$\mu$, and therefore, colored magenta couplers forming yellow dye masked images having a similar absorption maximum wavelength are now desired in the art.

5-Pyrazolones having an anilino group at the 3-position have a very high coupling rate, and they are characterized in that their coupling rate, even in the case of 3-anilino-5-pyrazolones having an arylazo group introduced in the 4-position, is much higher than that of other 5-pyrazolones. However, in spite of such characteristic property of the high coupling rate, most of these known 3-anilino-4-arylazo-5-pyrazolones are disadvantageous in that the absorption maximum wavelength of masked dye images formed by these couplers in the blue ray region is within a range of from about 400 to about 430 m$\mu$, and therefore, they are fatally defective in that when they are used in combination with now available useful colorless magenta couplers, no effective color compensation can be performed.

It is therefore a primary object of this invention to provide a colored magenta coupler which has a high coupling rate and gives a masked dye image having an absorption maximum wavelength in the blue ray region ranging from about 430 to about 460 m$\mu$; which has a high solubility in an organic solvent and is stable in a treating bath; which is excellent in photo-resistance and moisture resistance; which, on the coupling reaction, gives a magenta dye image of a good hue excellent in photo-resistance and moisture resistance; and which has a good adaptability to color compensation.

We have found that the foregoing object can be attained by a colored magenta coupler represented by the following general formula:

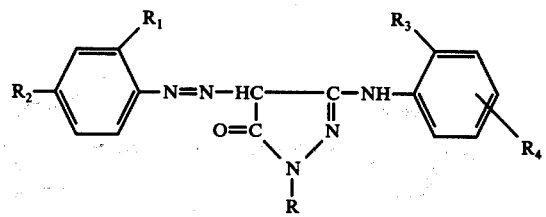

wherein R is a substituted phenyl group, $R_1$ and $R_2$ stand for a hydrogen or halogen atom or a hydroxyl, alkyl, alkoxy or acylamino group with the proviso that one of $R_1$ and $R_2$ should be a hydroxyl group but the case where both of $R_1$ and $R_2$ stand for a hydroxyl group coincidentally is excluded, $R_3$ is a hydrogen or halogen atom or an alkyl, alkoxy, nitro or acylamino group, and $R_4$ stands for a hydrogen or halogen atom or a monovalent organic residue such as alkoxy, acylamino, carbamoyl, sulfamoyl, alkylsuccinimido, alkoxycarbamido, alkoxycarboalkylamino, aralkoxycarboalkylamino, alkylaminocarboalkylamino, arylaminocarboalkylamino, araklylaminocarboalkylamino and nitro groups. Typical instances of the colored magenta coupler represented by the above general formula are illustrated below, and examples of synthesis of these compounds are given.

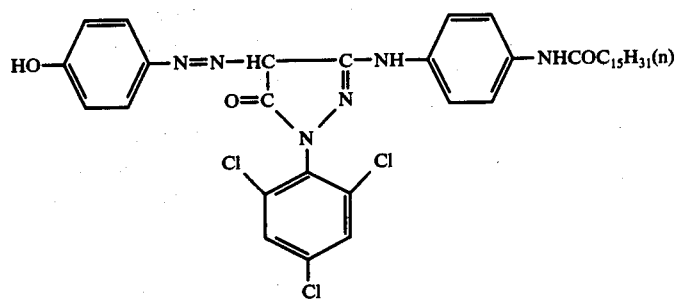
(1)
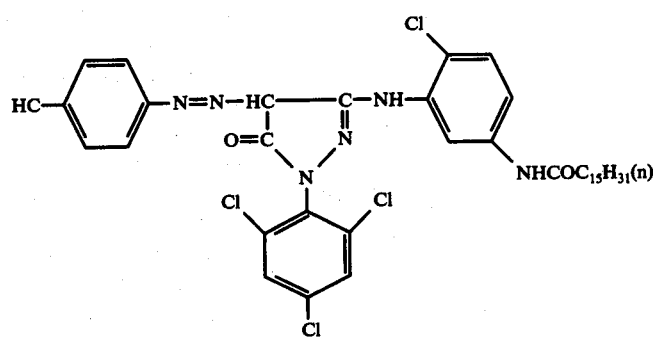
(2)
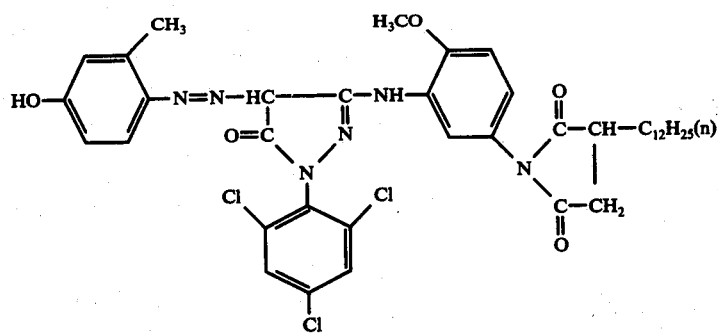
(3)
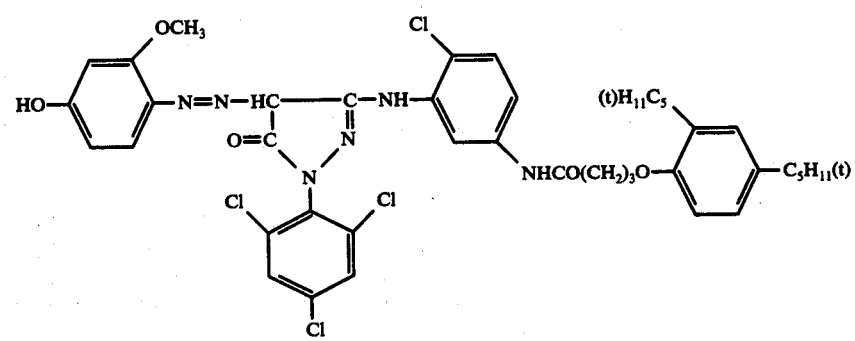
(4)
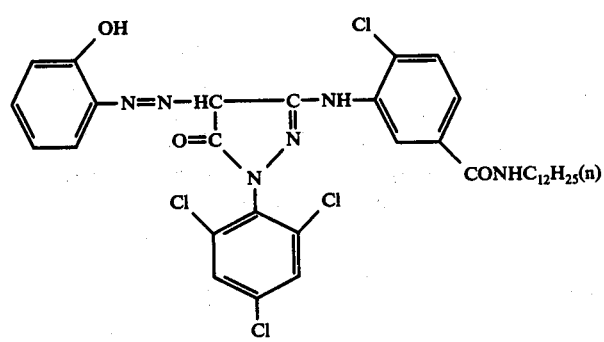
(5)

-continued
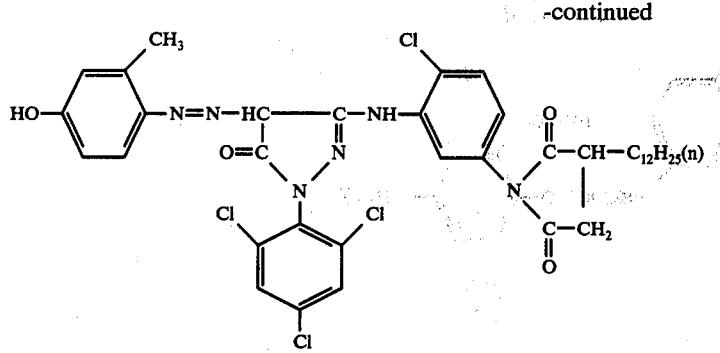
(6)
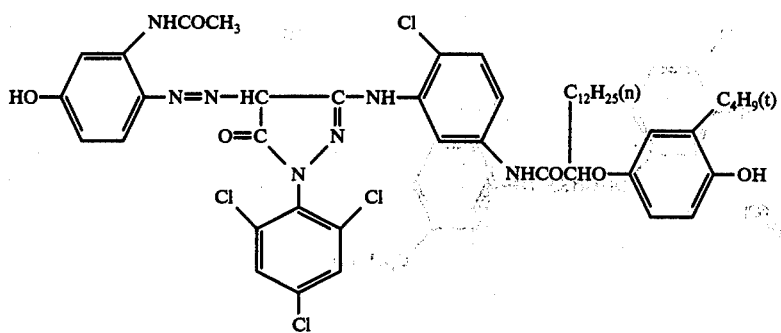
(7)
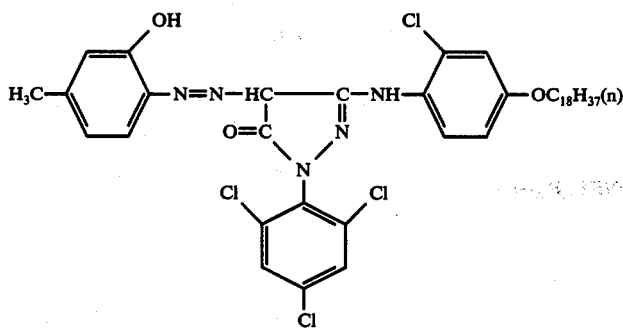
(8)
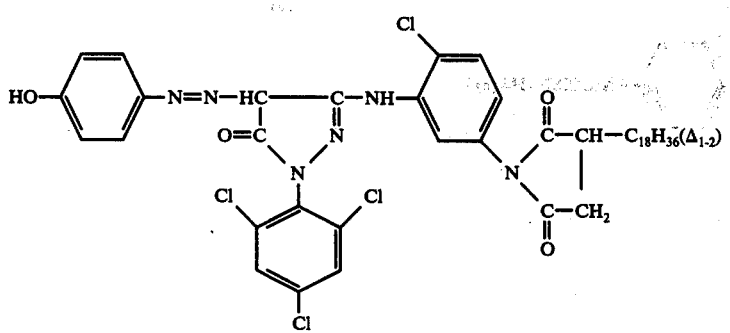
(9)
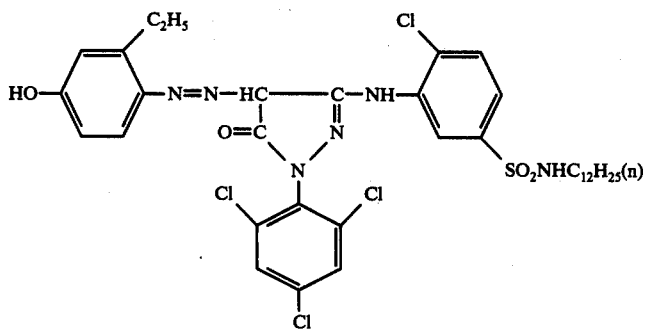
(10)

-continued
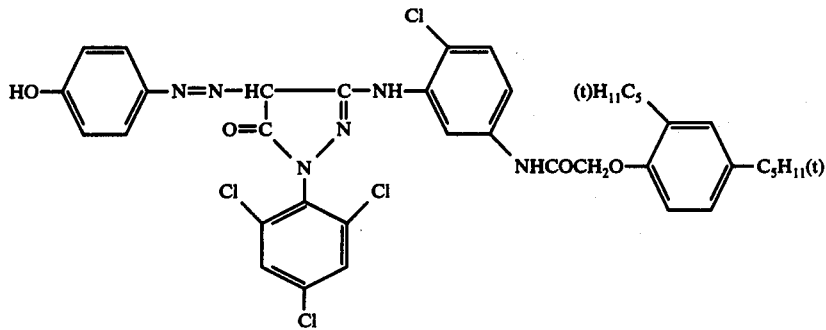 (11)
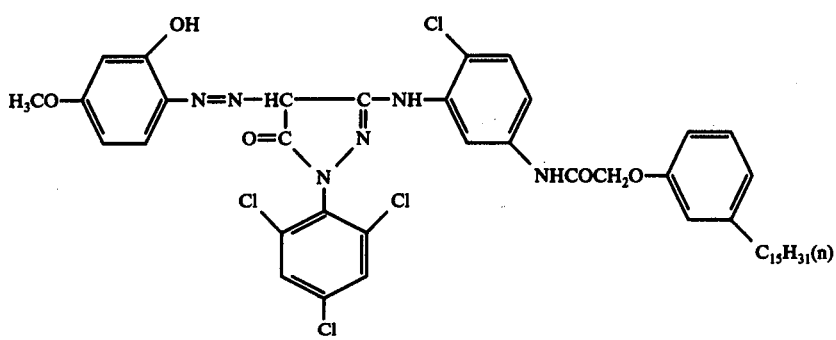 (12)
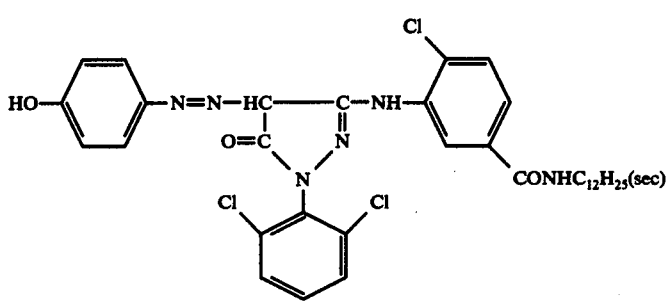 (13)
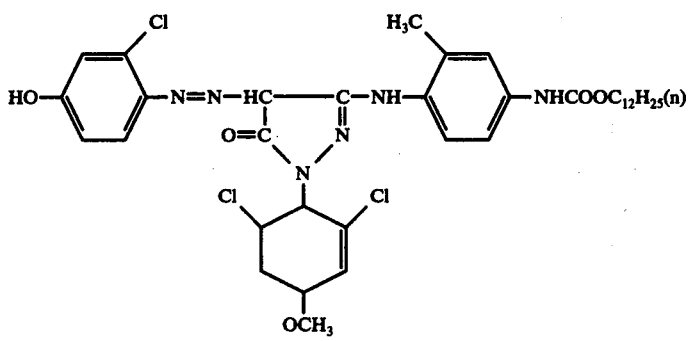 (14)
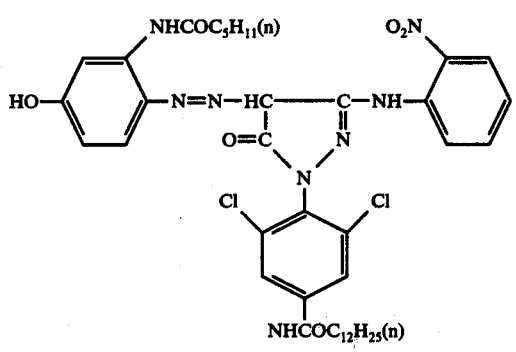 (15)

-continued
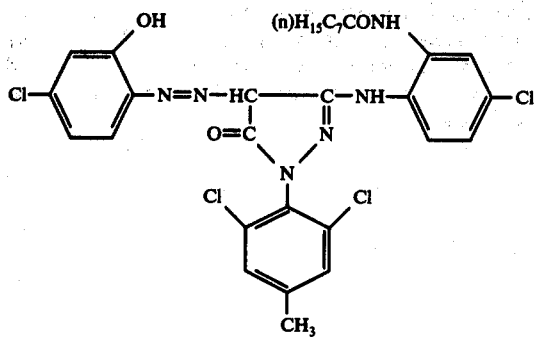 (16)
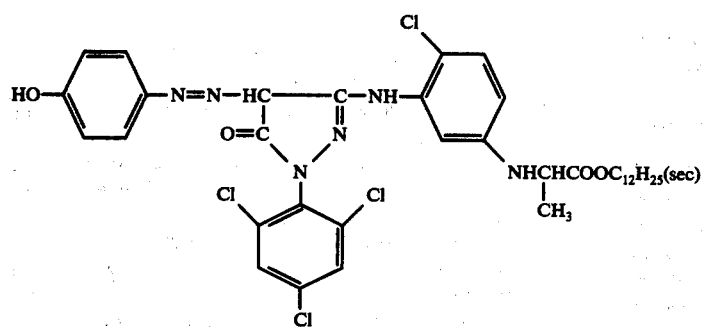 (17)
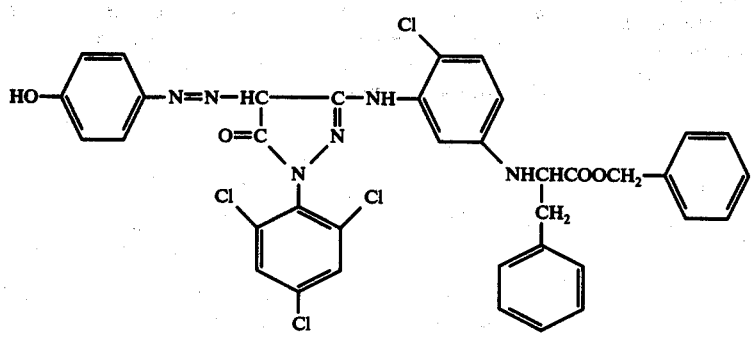 (18)
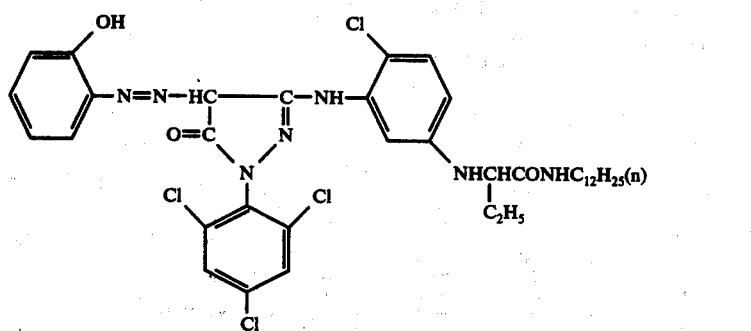 (19)
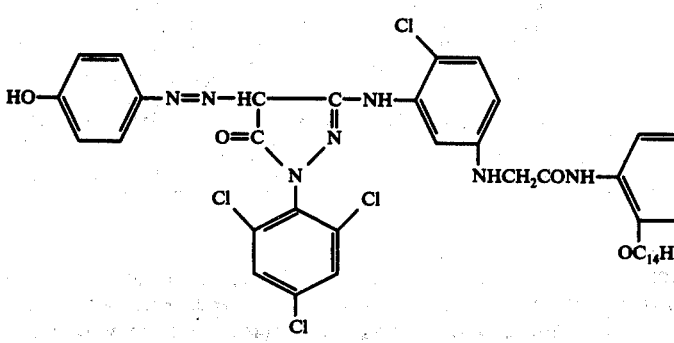 (20)

SYNTHESIS EXAMPLE 1

Synthesis of 1-(2,4,6-trichlorophenyl)-3-(2-chloro-3-palmitoylamidoanilino)-4-(4-hydroxyphenylazo)-5-pyrazolone (coupler No. 2).

1.2 g of p-aminophenol is dissolved in a solution composed of ml of concentrated hydrochloric acid and 20 ml of water, and a solution prepared in advance by dissolving 0.76 g of sodium nitrite in 5 ml of water is cooled below 5° C. and added dropwise to the above solution under agitation. After completion of the dropwise addition, agitation is continued for 10 minutes while maintaining the temperature below 5° C. to obtain a diazotizing liquid. Then, 6.4 g of 1-(2,4,6-trichlorophenyl)-3-(2-chloro-5-palmitoylamidoanilino)-5-pyrazolone is dissolved in 100 ml of pyridine, and the solution is maintained below 10° C. and the above diazotizing liquid is added dropwise thereto under agitation. After completion of the dropwise addition, agitation is continued for further 30 minutes and the mixture is flown into 300 ml of a 10% aqueous solution of hydrochloric acid. Precipitated crystals are recovered by filtration, washed with water, dried and recrystallized from 70 ml of ethyl acetate to obtain 5.0 g of the intended compound in the form of an orange-colored cotton-like crystal melting at 190° – 193° C. The absorption maximum wavelength of the so formed coupler is 430 m$\mu$ as measured in methyl alcohol by means of a self-spectrophotometer (Model EPS-3T manufactured by Hitachi Seisakusho), and results of the elementary analysis of the coupler are as follows:

|  | Elementary Analysis Values (%): | | | |
|---|---|---|---|---|
|  | C | H | N | C |
| Calculated | 58.27 | 5.81 | 11.02 | 18.59 |
| Found | 58.10 | 5.84 | 11.12 | 18.45 |

SYNTHESIS EXAMPLE 2

Synthesis of 1-(2,4,6-trichlorophenyl)-3-(2-chloro-5-dodecylcarbamoylanilino)-4-(2-hydroxyphenylazo)-5-pyrazolone (coupler No. 5).

Procedures of Synthesis Example 1 are repeated in the same manner except that 1.2 g of O-aminophenol is used instead of p-aminophenol and 6.0 g of 1-(2,4,6-trichlorophenyl)-3-(2-chloro-5-dodecylcarbamoylanilino)-5-pyrazolone is used instead of 1-(2,4,6-trichlorophenyl)-3-(2-chloro-5-palmitoylamidoanilino)-5-pyrazolone. When the product is recrystallized from 200 ml of ethyl acetate at the final step, there is obtained 2.2 g of the intended compound in a form of reddish brown sandlike crystals melting at 223° – 225° C. The absorption maximum wavelength of the so obtained coupler is 430 m$\mu$ and results of the elementary analysis are as follows:

|  | Elementary Analysis Values: | | | |
|---|---|---|---|---|
|  | C | H | N | C |
| Calculated | 56.67 | 5.31 | 11.66 | 19.68 |
| Found | 56.64 | 5.28 | 11.44 | 19.63 |

SYNTHESIS EXAMPLE 3

Synthesis of 1-(2,4,6-trichlorophenyl)-3-(2-chloro-5-dodecylsuccinimidoanilino)-4-(2-methyl-4-hydroxyphenylazo)-5-pyrazolone (coupler No. 6).

Procedures of Synthesis Example 1 are repeated in the same manner except that 1.35 g of 3-methyl-4-aminophenol is used instead of p-aminophenol and 6.5 g of 1-(2,4,6-trichlorophenyl)-3-(2-chloro-5-dodecylsuccinimidoanilino)-5-pyrazolone is used instead of 1-(2,4,6-trichlorophenyl)-3-(2-chloro-5-palmitoylamidoanilino)-5-pyrazolone. When the product is recrystallized from 30 ml of ethyl acetate at the final step, there is obtained 6.0 g of the intended compound in a form of reddish orange sand-like crystals melting at 171° – 173° C. The absorption maximum wavelength of the coupler is 440 m$\mu$, and results of the elementary analysis are as follows:

|  | Elementary Analysis Values (%): | | | |
|---|---|---|---|---|
|  | C | H | N | C |
| Calculated | 57.87 | 5.36 | 10.65 | 17.98 |
| Found | 57.84 | 5.33 | 10.58 | 18.01 |

Other illustrative couplers can readily be synthesized according to the above synthesis method, and absorption maximum wavelengths and elementary analysis results of the so synthesized couplers are as shown in Table 1 given below.

Table 1

| Coupler No. | Absorption Maximum Wavelength (m$\mu$) | Elementary Analysis Values (%) | | | | | | |
|---|---|---|---|---|---|---|---|---|
|  |  | Calculated | | | | Found | | |
|  |  | C | H | N | C | C | H | N | C |
| 1 | 430 | 61.03 | 6.23 | 11.54 | 14.61 | 60.86 | 6.01 | 11.73 | 14.50 |
| 3 | 438 | 59.73 | 5.78 | 10.72 | 13.56 | 59.94 | 5.51 | 10.52 | 13.73 |
| 4 | 442 | 58.88 | 5.41 | 9.81 | 16.55 | 58.90 | 5.39 | 9.82 | 16.61 |
| 7 | 434 | 59.06 | 5.80 | 10.26 | 14.84 | 58.89 | 5.61 | 10.36 | 15.01 |
| 8 | 440 | 60.68 | 6.49 | 8.85 | 17.92 | 60.74 | 6.22 | 8.71 | 17.90 |
| 9 | 434 | 60.28 | 5.88 | 9.81 | 16.56 | 60.01 | 5.98 | 10.05 | 16.74 |
| 10 | 436 | 53.57 | 5.39 | 10.71 | 18.07 | 53.57 | 5.41 | 10.73 | 18.15 |
| 11 | 432 | 58.65 | 5.05 | 10.52 | 17.76 | 58.82 | 5.29 | 10.71 | 17.49 |
| 12 | 444 | 60.13 | 5.83 | 9.35 | 15.78 | 59.91 | 5.94 | 9.33 | 15.77 |
| 13 | 432 | 59.51 | 5.72 | 12.25 | 15.50 | 59.52 | 5.72 | 12.40 | 15.39 |
| 14 | 433 | 57.95 | 5.81 | 11.26 | 14.26 | 58.12 | 5.60 | 11.31 | 14.40 |
| 15 | 430 | 59.32 | 6.22 | 13.83 | 8.75 | 59.08 | 6.37 | 13.95 | 8.88 |
| 16 | 431 | 54.22 | 4.55 | 12.65 | 21.34 | 54.20 | 4.55 | 12.67 | 21.11 |
| 17 | 436 | 56.54 | 5.53 | 10.99 | 18.54 | 56.73 | 5.64 | 11.02 | 18.37 |
| 18 | 435 | 58.28 | 3.70 | 11.02 | 18.60 | 58.20 | 3.51 | 10.87 | 18.35 |
| 19 | 436 | 57.14 | 5.83 | 12.61 | 18.24 | 56.93 | 5.61 | 12.58 | 18.07 |
| 20 | 435 | 59.38 | 5.68 | 11.28 | 16.31 | 59.69 | 5.56 | 11.07 | 16.18 |

The so obtained colored magenta couplers of this invention are very useful as so called protect-type dispersible colored magenta couplers which are used in the form dissolved in a high-boiling-point organic solvent having a boiling point higher than 175° C. and being immiscible with water, such as dibutyl phthalate and tricresyl phosphate. They can also be used in the form dissolved in, instead of the above high-boiling-point organic solvent, a substantially water-insoluble low-boiling-point organic solvent such as ethyl acetate, butyl acetate and butyl propionate or a water-soluble low-boiling-point organic solvent such as methyl alcohol, ethyl alcohol and methylisobutylketone.

When a green sensitive silver halide photographic emulsion incorporated with the colored magneta coupler of this invention is coated on a film base, exposed imagewise, developed with a liquid color developer containing a color developing agent such as N,N-disubstituted p-phenylene diamines, and bleached and fixed, a megenta color negative image and a yellow positive masked image can be obtained simultaneously. In this case, it is preferred that at least one substantially colorless magenta coupler capable of forming a colored dye image of the same hue as that of the negative image is used in combination. As such substantially colorless magenta coupler to be used in combination, there can be mentioned 1-aryl-3-anilino-5-pyrazolones which have no substituent at the 4-position unlike the colored magenta coupler of this invention, and other type pyrazolones which can be rendered non-diffusible from a photosensitive layer into which they are to be incorporated. Use of a substantially colorless magenta couplers capable of forming a magenta dye image, the absorption maximum wavelength in the blue ray region of which is very close to that of the magenta colored coupler of this invention, is especially preferred. As such couplers, there can be mentioned, for example, 1-(2,4-dichlorophenyl)-[3-3-(2,4-di-tertiary-amylphenoxyacetamido)-benzamido]-5-pyrazolone, 1-(2,5-dichlorophenyl)-3-[3-(2,4-di-tertiaryamylphenoxylacetamido)-benzamido]-5-pyrazolone, 1-(2,4,6-trichlorophenyl)-3-([3-(2,4-di-tertiray-amylphenoxyacetamido)-benzamido]-5-pyrazolone, 1-(2,4,6-tribromophenyl)-3-[β-(2,4-ditertiary-amylphenoxy)-propionamido]-5-pyrazolone, 1-(2,4,6-trichlorophenyl)-3-(2,4-ditertiary-amylphenoxyacetamido)-5-pyrazolone, 1 -(4,6-dichloro-2-methoxyphenyl)-3-[α(3-pentadecylphenoxy)-butyramido]-5-pyrazolone, 1-(2,4-dimethyl-6-chlorophenyl) -3-{3-[α-(3-pentadecyphenoxy)butyramido]-benzamido}-5-pyrazolone, 1-(2,4,6-trichlorophenyl)-3-[3-(2,4-di-tertiary-amylphenoxyacetamido) -phenylureido[-5-pyrazolone, 1-(2,4,6-trichlorophenyl)-3-[2-chloro-5-(2,4-di-tertiary-amylphenoxyacetamide)-anilino]-5-pyrzolone, 1-(2,4,6-trichlorophenyl)-3-(2-chloro-5-dodecylsuccinimidoanilino)-5-pyrazolone, 1-(2,4,6-trichlorophenyl)-3-(2-chloro-5-octadecylcarbamoylanilino)-5-pyrazolone, 1-(2,4,6-trichlorophenyl)-3-(2-chloro-5-dodecylsufamoylanilino)-5-pyrazolone, 1-{4-[α-3-tertiary-butyl-4-hydroxyphenoxy)-tetradecanamido]-2,6-dichlorophenyl}-3-(2,4-dichloroanilino)-5-pyrazolone, 1-(2,4,6-trichlorophenyl-3-{2-chloro-5-[α-(3-tertiary-butyl-4hydroxyphenoxy)tetradecanamido]-anilino}-5-pyrazolone, etc.

Since the colored magenta coupler of this invention has a very high coupling rate and it has hydrophilic characteristics because of the presence of a hydroxyl group in the structure of the arylazo component at the 4-position, which is to be split off by the coupling reaction, it has such an advantage that it can be dissolved out from the photographic photosensitive material layer during the development treatment. Further, the colored magenta coupler of this invention does not cause an undesired interaction with a sensitizing dye used for a silver halide photosensitive emulsion or it does not cause reduction of the spectral sensitivity of a photosensitive layer to green rays.

A green sensitive silver halide emulsion layer incorporated with the colored magenta coupler of this invention is used in combination with a blue sensitive silver halide emulsion layer incorporated with a yellow coupler and a red sensitive silver halide emulsion layer incorporated with a cyan coupler, for formation of a photosensitive material for color photography. At this time there can be used according to need other photographic layers such as a filter layer, an intermediate layer, a protective layer, an undercoating layer, a back undercoating layer and the like. Further, each of silver halide emulsion layers having sensitivities to respective wavelength regions can have a two-layer structure in which the sensitivity differs in the two layers.

Conventional known methods can be adopted for incorporating the colored magenta coupler of this invention alone or in combination with a substantially colorless magenta coupler such as mentioned above into a photosensitive material for color photography. For example, when it is used as the above-mentioned protect-type dispersible coupler, there can be adopted a method comprising dissolving the coupler into a high-boiling-point organic solvent having a boiling point higher than 175° C., such as tricresyl phosphate and dibutyl phthalate, a low-boiling-point organic solvent such as ethyl acetate and butyl propionate, or a mixture thereof, mixing the solution with an aqueous solution of gelatin containing a surface active agent, emulsifying and dispersing the mixture by means of a high speed rotary mixer or colloid mill, adding the resulting emulsified dispersion directly to a silver halide photographic emulsion, and coating and drying the resulting emulsion on a support. There can also be adopted a method comprising setting the above-mentioned emulsified dispersion, finely cutting the set dispersion, removing the low-boiling-point solvent therefrom by water washing or the like, adding the residue to a silver halide photographic emulsion, and coating and drying the emulsion on a support. At this step, it is generally preferred that the colored magenta coupler of this invention and the colorless magenta coupler are used in a total amount of 10 to 100 g per mole of the silver halide, and that the latter coupler is used in an amount of about 4 to about 10 parts by weight per part by weight of the former coupler. Such amount and mixing ratio of the couplers can be optionally changed depending on the application object and the like.

As the photographic emulsion to be used for forming a magenta dye image and a yellow masked image with use of the colored magenta coupler of this invention, there can be mentioned various silver halide emulsions such, for example, as silver bromide, emulsion, silver iodobromide emulsions and the like. These emulsions may be chemically sensitized or optically sensitized with a carbocyanine dye, a merocyanine dye or the like. They may comprise ordinary photographic additives such as a fog-preventive agent, a stabilizer, a stain-preventive agent, a halation-preventive agent, a macromolecular additive for improving physical properties, a hardening agent, a coating assistant and the like.

As the developing agent to be used for color development of a silver halide photosensitive material incorporated with the colored magenta coupler of this invention, there can be mentioned, for example, color developing agents of the phenylene diamine type for silver halide emulsions, such as diethyl-p-phenylene diamine hydrochloride, monomethyl-p-phenylene diamine hydrochloride, dimethyl-p-phenylene diamine hydrochloride, 2-amino-5-diethylaminotoluene hydrochloride, 2-amino-5-(N-ethyl-N-dodecylamino)-toluene, N-ethyl-N-β-methanesulfonamidoethyl-3-methyl-4-aminoaniline sulfate, N-ethyl-N-β-methanesulfonamidoethyl-4-aminoaniline and 4-N-ethyl-N-β-hydroxyethylaminoaniline, and color developing agents of the p-aminophenol type in which the amino group has no substituent.

The color development can be performed effectively within a temperature range customarily adopted in this field, and better results can be obtained even at the high-temperature high-speed development treatment.

This invension will now be illustrated more detailedly by reference to Examples which by no means limit the scope of this invention. In the following Examples, colored magenta couplers of the following structure were employed as comparative colored magenta coupler having a structure similar to that of the colored magenta coupler of this invention:

Comparative Coupler (I)

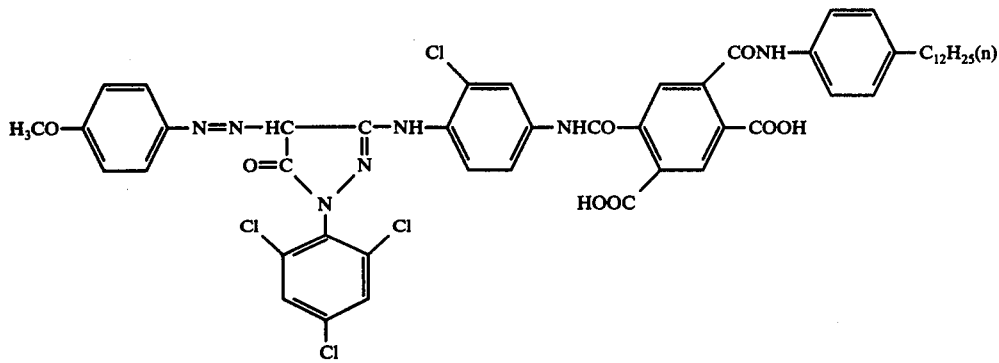

Comparative Coupler (II)

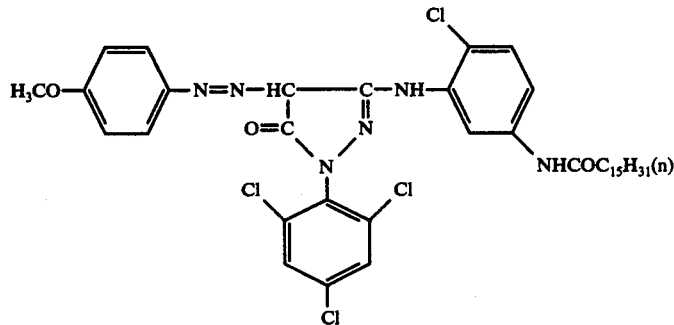

Comparative Coupler (III)

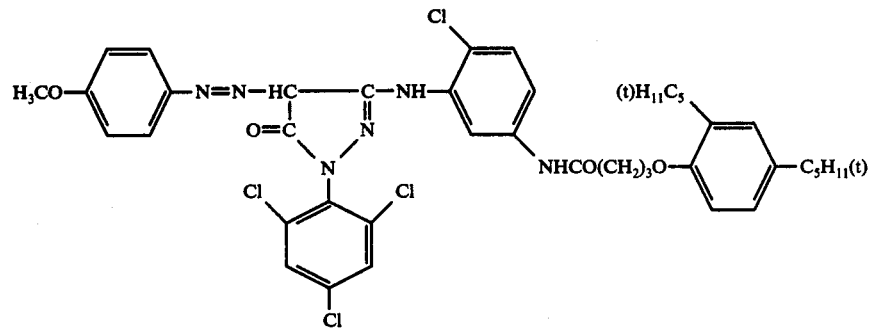

Comparative Coupler (IV)

-continued

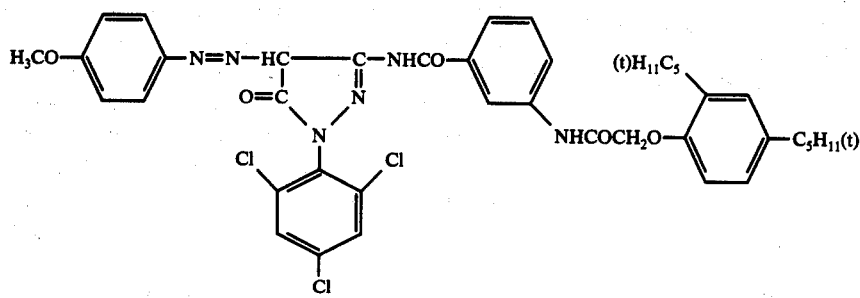

EXAMPLE 1

The solubility of each of couplers Nos. 2, 6 and 11 of this invention and comparative couplers (II) and (III) in a high-boiling-point solvent was examined. More specifically, dibutyl phthalate was used as the high-boiling-point solvent, and the amount (m$l$) of the solvent necessary for dissolving 1 g of the coupler completely in the solvent at 60° C. was measured, and then, the time required for precipitation of the coupler when the so formed solution was allowed to stand still at a lowered temperature of 25° C. were also measured. Results are shown in Table 2.

| Coupler | Amount (ml) of Dibutyl Phthalate | Time (min) Required for Precipitation |
|---|---|---|
| coupler No. 2 of this invention | 15 | 30 |
| coupler No. 6 of this invention | 15 | 30 |
| coupler No. 11 of this invention | 10 | 60 |
| comparative coupler (II) | 25 | 20 |
| comparative coupler (III) | 20 | 30 |

As is apparent from the results shown in Table 2, the couplers of this invention have a much higher solubility in dibutyl phthalate as the high-boiling-point solvent than the comparative couplers.

EXAMPLE 2

2 g of the coupler No. 4, 9 or 11 of this invention or the comparative coupler (I), (III) or (IV) was mixed with 18 g of 1-(2,4,6-trichlorophenyl)-3-[3-(2,4-di-tertiary-amylphenoxyacetamido)-benzamido]-5-pyrazolone, and the mixture was added to a liquid mixture composed of 20 m$l$ of dibutyl phthalate and 60 m$l$ of ethyl acetate. The mixture was heated at 60° C. to disolve the two couplers completely. The resulting solution was mixed with 10 m$l$ or a 6% aqueous solution of Alkanol B (alkylnaphthalene sulfonate manufactured by DuPont Co.) and 200 m$l$ of a 6% aqueous solution of gelatin, and the mixture was emulsified by means of a colloid mill to prepare a dispersion containing the two couplers in combination. Then, the so formed coupler dispersion was added to 1 Kg of a high-sensitivity gelatin emulsion of silver iodobromide (containing 3 mole % of silver iodide) and the resulting emulsion was coated and dried on a cellulose triacetate film base. Thus were prepared 6 kinds of photographic photosensitive materials having a stable coating film. Each of these photographic photosensitive materials was exposed to eight imagewise according to a customary method and subjected to the color development at 20° C for 10 minutes with use of a liquid color developer having the following composition:

| Composition of Liquid Color Developer | |
|---|---|
| N-ethyl-N-(β-methanesulfonamido-ethyl)-3-methyl-4-aminoaniline sulfate | 5.0 g |
| anhydrous sodium sulfite | 2.0 g |
| benzyl alcohol | 3.8 ml |
| sodium carbonate monohydrate | 50.0 g |
| potassium bromide | 1.0 g |
| sodium hydroxide | 0.55 g |
| water | balance |
| total | 1000 ml |

Then, the stopping, bleaching and fixation treatments were conducted according to customary procedures, followed by water washing and drying. Thus were obtained 6 kinds of samples having a negative image of a magenta color and a positive masked image.

Each sample was tested with respect to the coloring sensitivity, the absorption maximum wavelength of the positive masked image and the photo-resistance of the positive masked image. Results are shown in Table 3.

Table 3

| Coupler Added | Coloring Sensitivity | Positive Masked Image | |
|---|---|---|---|
| | | Absorption Maximum Wavelength (mμ) | Photo-Resistance (dye image residual ratio, %) |
| coupler No. 4 | 180 | 458 | 89 |
| coupler No. 9 | 265 | 443 | 92 |
| coupler No. 11 | 240 | 445 | 90 |
| comparative coupler (I) | 150 | 420 | 82 |
| comparative coupler (III) | 130 | 425 | 86 |
| comparative coupler (IV) | 100 | 445 | 74 |

In the above Table, the coloring sensitivity is expressed in terms of a relative value based on the coloring sensitivity of the sample of the comparative coupler (IV) which is defined as 100. As regards the photo-resistance, the yellow color density of the positive masked image was determined as transmission density by means of a densitometer (Model PD-7R manufactured by Konishiroku Shashin Kogyo Kabushiki Kaisha) provided with a blue filter, and after the sample was exposed for 16 hours with use of a xenon Fade-Ometer (Model 6XHC manufactured by Toyo Rika Kogyo Kabushiki Kaisha), the yellow color density of the positive masked image was determined again in the same manner as above. The photo-resistance is expressed in terms of the dye image residual ratio (%), namely the ratio (%) of the density after exposure to the density before exposure.

As is apparent from the results shown in Table 3, samples prepared with use of the couplers of this invention have a higher coloring sensitivity and a higher coupling rate than samples prepared with use of the comparative couplers. Further, yellow positive masked images formed with use of the couplers of this invention have a desired absorption maximum wavelength and an excellent photo-resistance.

EXAMPLE 3

8 g of the coupler No. 5, 6 or 13 of this invention or the comparative coupler (III) or (IV) was added to a liquid mixture composed of 20 m/ of dibutyl phthalate and 60 m/ of ethyl acetate, and the mixture was heated at 60° C. to dissolve the coupler completely. The resulting solution was mixed with 10 m/ of a 6% aqueous solution of Alkanol B and 200 m/ of a 6% aqueous solution of gelatin, and the liquid mixture was emulsified by a colloid mill to obtain a coupler-containing dispersion. The so formed dispersion was added to 1 Kg of a high-sensitivity gelatin emulsion of silver iodobromide (containing 3 mole % of silver iodide), and the emulsion was coated and dried on a polyethylene terephthalate film base. Thus were obtained 5 kinds of photographic photosensitive materials having a stable coating film. Each of these photographic photosensitive materials was subjected to the wedge light exposure according to a customary method, and then subjected to the color development treatment at 38° C. for 3 minutes and 15 seconds with use of a liquid color developer of the following composition:

| Composition of Liquid Color Developer | |
|---|---|
| N-methyl-N-($\beta$-hydroxyethyl)-3-methyl-4-aminoaniline sulfate | 5.0 g |
| hydroxylamine sulfate | 2.0 g |
| anhydrous potassium carbonate | 26.0 g |
| anhydrous sodium bicarbonate | 3.5 g |
| potassium sulfite dihydrate | 18.0 g |
| potassium bromide | 1.3 g |
| sodium chloride | 0.2 g |
| sodium nitrilotriacetate (monohydrate) | 2.0 g |
| water | balance |
| total | 1000 ml |

The pH of the above liquid developer was adjusted to 10.5.

Then, the developed photographic photosensitive material was divided into two portions promptly, and one of them was bleached and fixed at 38° C. for 6 minutes with use of a bleaching and fixing liquid of the following composition:

| Composition of Bleaching and Fixing Liquid | |
|---|---|
| iron ammonium ethylendiamine tetraacetate | 45.0 g |
| diammonium ethylenediamine tetraacetate | 5.0 g |
| ammonium thiocyanate | 10.0 g |
| anhydrous sodium sulfite | 10.0 g |
| ammonium thiosulfate | 60.0 g |
| water | balance |
| total | 1000 ml |

The pH of the above treating liquid was adjusted to 6.7.

Then, the so treated photosensitive material was water-washed for 3 minutes and 15 seconds, dipped in a stabilization bath for 1 minute and 30 seconds and dried. Thus were obtained 5 kinds of samples I having a negative image of a magenta coupler and a positive masked image.

The remaining half of the photosensitive material was fixed and water-washed just after the above-mentioned division, and it was then treated with hydrogen chloride gas to decolorize the dye image. Thus were obtained 5 kinds of samples II having a silver image alone.

With respect to the samples I, the magenta dye density of the negative image was determined, and with respect to samples II, the silver density of the silver image was determined. The silver density obtained when each sample II was exposed to light of the same quantity as giving the magenta dye density of 1.0 on the light exposure of the sample I was measured, and the coloration coefficient was expressed in terms of the reciprocal number of the so determined silver density. The coupling rates of couplers were compared with each other by reference to the so obtained values of the coloration coefficient. Results are shown in Table 4.

| Coupler Added | Coloration Coefficient |
|---|---|
| coupler No. 5 of this invention | 6.2 |
| coupler No. 6 of this invention | 4.8 |
| coupler No. 13 of this invention | 6.0 |
| comparative coupler (III) | 3.5 |
| comparative coupler (IV) | 3.5 |

As is apparent from the results shown in Table 4, the couplers of this invention have a much higher coloring coupling rate than the comparative couplers.

What is claimed is:

1. A photo-sensitive silver halide color photographic material having a support and a photo-sensitive silver halide emulsion layer coated thereon, comprising a colored magenta coupler represented by the following general formula:

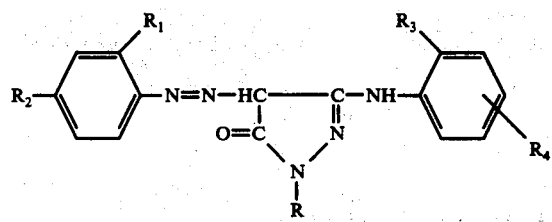

wherein R is phenyl having a substituent or substituents selected from chlorine, alkyl, alkoxy and acylamino; $R_1$ and $R_2$ are individually hydrogen, halogen, hydroxyl, alkyl, alkoxy or acylamino provided that one of $R_1$ and $R_2$ is hydroxyl and that the other is not hydroxyl; $R_3$ is hydrogen, halogen, alkyl, alkoxy, nitro or acylamino; and $R_4$ is hydrogen, halogen or a monovalent organic residue selected from alkoxy, acylamino, carbamoyl, sulfamoyl, alkylsuccinimido, alkoxycarbamido, alkoxycarboalkylamino, aralkoxycarboalkylamino, alkylaminocarboalkylamino, arylaminocarboalkylamino, aralkylaminocarboalkylamino, or nitro.

2. A photo-sensitive silver halide color photographic material according to claim 1 further comprising a colorless magenta coupler.

3. A color photographic material comprising a support having thereon at least one silver halide emulsion layer containing a colored coupler of the formula:

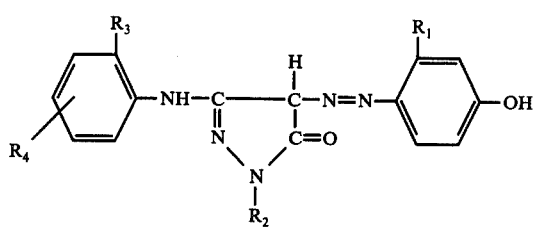

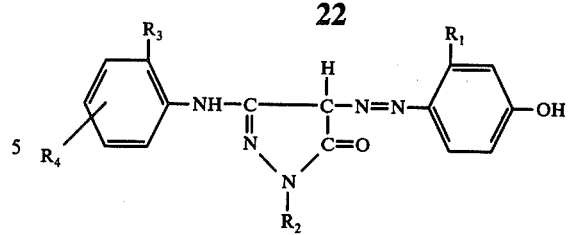

wherein $R_1$ is hydrogen or alkyl; $R_2$ is phenyl substituted with chlorine, alkoxy or acylamino; $R_3$ is chlorine or alkoxy, and $R_4$ is a moiety containing a hydrophobic diffusion resisting group.

* * * * * wherein $R_1$ is hydrogen or alkyl; $R_2$ is phenyl substituted with chlorine, alkoxy or acylamino; $R_3$ is chlorine or alkoxy, and $R_4$ is a moiety containing a hydrophobic diffusion resisting group.

* * * * *